United States Patent
Lee et al.

(10) Patent No.: US 9,725,543 B2
(45) Date of Patent: Aug. 8, 2017

(54) HEXAFLUOROPROPYLENE OXIDE POLYMER COMPOSITIONS AND A PREPARING METHOD OF HEXAFLUOROPROPYLENE OXIDE POLYMER USING HEXAFLUOROPROPYLENE OLIGOMER

(71) Applicant: Korea Research Institute of Chemical Technology, Daejeon (KR)

(72) Inventors: Soo-Bok Lee, Daejeon (KR); In Jun Park, Daejeon (KR); Jong-Wook Ha, Daejeon (KR); Kwang Won Lee, Daejeon (KR); Sang Goo Lee, Jeollabuk-do (KR)

(73) Assignee: Korea Research Institute of Chemical Technology, Daejeon (KR)

(*) Notice: Subject to any disclaimer, the term of this patent is extended or adjusted under 35 U.S.C. 154(b) by 86 days.

(21) Appl. No.: 14/540,551

(22) Filed: Nov. 13, 2014

(65) Prior Publication Data

US 2015/0073112 A1    Mar. 12, 2015

Related U.S. Application Data

(62) Division of application No. 13/255,013, filed as application No. PCT/KR2009/004191 on Jul. 28, 2009, now Pat. No. 8,916,666.

(30) Foreign Application Priority Data

Mar. 6, 2009  (KR) .................. 10-2009-0019260

(51) Int. Cl.
*C08F 214/28* (2006.01)
*C08G 65/22* (2006.01)

(52) U.S. Cl.
CPC .......... *C08F 214/28* (2013.01); *C08G 65/226* (2013.01)

(58) Field of Classification Search
USPC .................................................. 526/247, 209
See application file for complete search history.

(56) References Cited

U.S. PATENT DOCUMENTS

| | | | |
|---|---|---|---|
| 3,322,826 A | 5/1967 | Moore | |
| 3,412,148 A | 11/1968 | Arbogast | |
| 8,916,666 B2 * | 12/2014 | Lee | C08F 214/28 526/209 |

FOREIGN PATENT DOCUMENTS

| | | | |
|---|---|---|---|
| EP | 0834526 A | | 4/1998 |
| EP | 834526 A1 * | | 4/1998 |

(Continued)

OTHER PUBLICATIONS

Kostjuk et al., Macromolecules, vol. 42, pp. 612-619 (2009).*

(Continued)

*Primary Examiner* — Mark Kaucher
*Assistant Examiner* — Henry Hu
(74) *Attorney, Agent, or Firm* — Haug Partners LLP

(57) ABSTRACT

The present invention relates to hexafluoropropylene oxide polymer composition and a process of preparing of hexafluoropropylene oxide polymer by an anionic polymerization, and in particular the hexafluoropropylene oxide polymer composition comprises an anionic initiator, a polar solvent, hexafluoropropylene and hexafluoropropylene oxide. The hexafluoropropylene oxide polymer is prepared under particular reaction conditions by using the composition, hexafluoropropylene oxide poylymer prepared by using the composition according to a preparation process herein has a weight average molecular weight (Mw) of 1,500-4,000 at −10 to 20° C.

4 Claims, 1 Drawing Sheet

(56) References Cited

FOREIGN PATENT DOCUMENTS

| EP | 0947534 A    | 10/1999 |
|----|--------------|---------|
| EP | 947534 A1 *  | 10/1999 |
| EP | 1698650 A    | 9/2006  |
| EP | 1698650 A1 * | 9/2006  |
| EP | 1858952 B    | 8/2008  |
| EP | 1858952 B1 * | 8/2008  |

OTHER PUBLICATIONS

Kostjuk, Sergei V. et al.: "Anionic Ring-Opening Polymerization of Hexafluoropropylere Oxide Using Alkali Metal Fluorides as Catalysts: A Mechanistic Study", *Macromolecules*, 2009, 42, pp. 612-619.

* cited by examiner

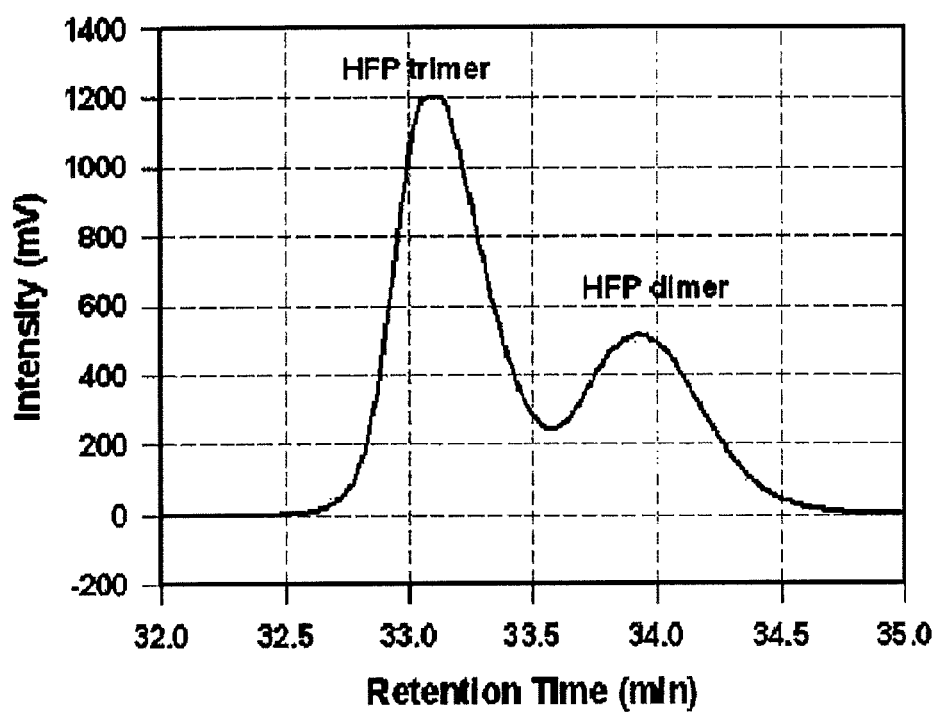

HEXAFLUOROPROPYLENE OXIDE POLYMER COMPOSITIONS AND A PREPARING METHOD OF HEXAFLUOROPROPYLENE OXIDE POLYMER USING HEXAFLUOROPROPYLENE OLIGOMER

This application is a division of U.S. patent application Ser. No. 13/255,013 filed Sep. 6, 2011, now U.S. Pat. No. 8,916,666, which is a 371 filing of PCT/KR2009/004191 filed on Jul. 28, 2009 published on Sep. 10, 2010 under publication number WO 2010/101337 A which claims priority benefits to Korean Patent Application Number 10-2009-0019260 filed Mar. 6, 2009, the disclosures of which are all incorporated herein by reference.

TECHNICAL FIELD

The present invention relates to hexafluoropropylene oxide polymer composition comprising an anionic initiator, a polar solvent, hexafluoropropylene and hexafluoropropylene oxides, and also to a process of preparing hexafluoropropylene oxide polymer having a weight average molecular weight (Mw) of 1,500-4,000 at −10 to 20° C. under particular reaction conditions by using the composition according to an anionic polymerization method.

BACKGROUND ART

Polymer of hexafluoropropylene oxide is a known material. If end groups are removed from a hexafluoropropylene oxide polymer comprising only carbon, fluorine and oxygen, it becomes superior in thermal stability, antioxidation, mechanical stability, anticorrosive property, etc. The hexafluoropropylene oxide polymer can be used even at extremely low or high temperature, and is widely used in vacuum pumps, automobiles, memory hard disks for storing information, high-performance diluents for the use in aerospace engineering, due to its lubricative durability. Its application has been also expanded into various areas such as greases, release agents, liquids with a relatively low refractive index and oils. In particular, researches have been performed on how to prevent reflection by using an end-function-modified polymer with a weight average molecular weight of 400-1,000. Applicability of a polymer with a weight average molecular weight of 2,000-6,000 to an anti-fingerprint agent is also under study.

U.S. Pat. Nos. 3,412,148 and 3,322,826 disclose processes of preparing polymers of hexafluoropropylene oxide. In these processes, an anionic initiator is prepared and hexafluoropropylene is used as a diluent. As a result, hexafluoropropylene oxide is polymerized into a polymer with a weight average molecular weight of about 5,500. For using hexafluoropropylene as a diluent, reaction should be conducted at an extremely low temperature such as −30° C. or lower. A recent study reports the results of research activities using various polar solvents and under various reaction temperatures [Macromolecules, 2009, 42 (3), 612-619].

However, there has been no research report regarding a process of polymerizing hexafluoropropylene oxide by directly using hexafluoropropyl oligomer.

DISCLOSURE OF INVENTION

Technical Problem

The present inventors have performed intensive researches to overcome the aforementioned problems of the conventional anionic polymerization method of preparing hexafluoropropylene oxide (HFPO) polymer. As a result, they have succeeded in selecting suitable compositions used in the process, their mixing ratio and reaction conditions, thereby finally achieving a process of preparing hexafluoropropylene oxide polymer having a weight average molecular weight (Mw) 1,500-4,000 at −10 to 20° C. with a high yield. The present invention aims to provide HFPO polymer composition and a process of preparing of HFPO polymer with a high yield.

Solution to Problem

To overcome the technical problems, in an aspect, the present invention discloses a hexafluoropropylene oxide polymer composition comprising an anionic initiator, a polar solvent, hexafluoropropylene, and hexafluoropropylene oxide.

In another embodiment, the present invention discloses a HFPO polymer herein has a structure of Formula 1:

$$CF_3CF_2CF_2O(CF(CF_3)CF_2O)_nCF(CF_3)COF \quad \text{[Formula 1]}$$

wherein n is an integer of 8-25.

In a further aspect, the present invention discloses a process of preparing hexafluoropropylene oxide polymer, the process comprising (a) preparing hexafluoropropylene oligomer by introducing hexafluoropropylene to a mixture of an anionic initiator and a polar solvent at 20-40° C. and under nitrogen atmosphere; and (b) preparing hexafluoropropylene oxide polymer of Formula 1 by introducing hexafluoropropylene oxide to a reactor after the step (a) is conducted at an average rate of 1.5-2.5 g/min at −10 to 20° C.:

$$CF_3CF_2CF_2O(CF(CF_3)CF_2O)_nCF(CF_3)COF: \quad \text{[Formula 1]}$$

wherein n is an integer of 8-25.

Advantageous Effects of Invention

By using a process of preparing HFPO polymer as disclosed in the present invention, HFPO polymer having a weight average molecular weight of 1,500-4,000 can be easily obtained at −10° C. to 20° C., which is much higher than the temperature of the conventional process (−30° C.). The yield is high and molecular weight distribution is relatively uniform.

BRIEF DESCRIPTION OF DRAWINGS

The FIGURE shows the GPC results of HFP oligomer prepared Example 1.

BEST MODE FOR CARRYING OUT THE INVENTION

Hereunder is provided a detailed description of the present invention.

As used herein, the terms of hexafluoropropylene, hexafluoropropylene oligomer and hexafluoropropylene oxide are referred to as 'HFP', 'HFP oligomer' and 'HFPO', respectively. The present invention discloses a HFPO polymer composition comprising an anionic initiator, a polar solvent, hexafluoropropylene (HFP), and hexafluoropropylene oxide (HFPO). In an embodiment, a HFPO polymer has a structure of Formula 1 below:

$$CF_3CF_2CF_2O(CF(CF_3)CF_2O)_nCF(CF_3)COF \quad \text{[Formula 1]}$$

wherein n is an integer of 8-25, preferably 10-25.

Fluorinated metal, preferably at least one fluorinated metal selected from the group consisting of cesium fluoride (CsF) and potassium fluoride (KF), can be used as the anionic initiators, which is one of the ingredients in the present invention. The anionic initiator is used in the amount of 2-5 weight parts, more preferably 2.5-4 weight parts relative to 100 weight parts of the HFP. When the amount of the anionic initiator is less than 2 weight parts, the production of hexafluoropropylene oligomer becomes small and reaction rate decreases. When the amount is more than 5 weight parts, reaction heat may be uncontrollable due to the increase in the reaction rate.

Tetraethyleneglycolmethylether may be used as the polar solvent. The polar solvent is used in the amount of 2-10 weight parts, more preferably 2.5-8 weight parts relative to 100 weight parts of the HFP. When the amount of the polar solvent is less than 2 weight parts, the reaction rate may be insufficient and a large amount of hexafluoropropylene trimer may be produced. When the amount is more than 10 weight parts, although the reaction rate increases, a large amount of hexafluoropropylene trimer may be produced.

The HFP is a reactant used for the production of hexafluoropropylene (HFP) oligomer, which anionically reacts with the anionic initiator and serves as a diluent. The produced HFP oligomer contains hexafluoro trimer comprising at least one hexafluoro dimer selected from the group consisting of 1,1,1,2,3,4,5,5,5-nonafluoro-4-(trifluoromethyl)pent-2-ene and 1,1,1,3,4,4,5,5,5-nonafluoro-2-(trifluoromethyl)pent-2-ene and 1,1,1,3,4,5,5,5-octafluoro-2,4-bis(trifluoromethyl)pent-2-ene.

The HFPO is used in the amount of 300-700 weight parts, more preferably 400-600 weight parts relative to 100 weight parts of the HFP. When the amount of the HFPO is less than 300 weight parts, the weight average molecular weight of the HFPO polymer may be insufficient. When the amount is more than 700 weight parts, HFPO polymer with a relatively low molecular weight may increase.

Hereunder is provided a detailed description of a process of preparing HFPO polymer by using HFPO polymer composition through an anionic polymerization.

The present invention discloses a process of preparing hexafluoropropylene oxide polymer, the process comprising (a) preparing hexafluoropropylene oligomer by introducing hexafluoropropylene to a mixture of an anionic initiator and a polar solvent at 20-40° C. and under nitrogen atmosphere; and (b) preparing hexafluoropropylene oxide polymer of Formula 1 by introducing hexafluoropropylene oxide to a reactor at an average rate of 1.5-2.5 g/min at −10 to 20° C.:

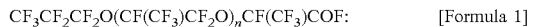

[Formula 1]

wherein n is an integer of 8-25, preferably 10-25.

Anionic initiator, polar solvent, HFP, HFP oligomer and types and amounts of HFPO are the same as described above regarding the HFPO polymer composition.

The step (a) is to prepare a HFP oligomer at 20-40° C. and under nitrogen atmosphere. The reaction is conducted at 20-40° C., more preferably 25-35° C. When the temperature is lower than 20° C., reaction rate may be insufficient. When the temperature is higher than 40° C., a large amount of HFP oligomer trimer may be produced. The produced HFP oligomer are hexafluoro dimer and hexafluoro trimer, and preferably contains at least two entities selected from the group consisting of 1,1,1,2,3,4,5,5,5-nonafluoro-4-(trifluoromethyl)pent-2-ene, 1,1,1,3,4,4,5,5,5-nonafluoro-2-(trifluoromethyl)pent-2-ene and 1,1,1,3,4,5,5,5-octafluoro-2,4-bis(trifluoromethyl)pent-2-ene. The HFP oligomer produced during the step (a) is preferred to contain hexafluoro dimer and hexafluoro trimer in a weight ratio of 20-40:80-60. The weight ratio of the dimer to the trimer is either lower than 20:80 or higher than 40:60, weight average molecular weight of HFPO polymer may decrease.

The step (b) is to prepare HFPO polymer of Formula 1 through an anionic polymerization by introducing HFPO at −10-40° C. to a reactor after the step (a) is conducted. For obtaining HFPO polymer with a weight average molecular weight of 3,000-4,000, reaction temperature is preferred to be controlled within −10 to 10° C. When the temperature is lower than −10° C., HFP oligomer acts as diluent insufficiently, thus failing to allowing HFPO polymer to grow. When the temperature is higher than 10° C., the dissociation of fluoride anions increase and the portion of HFPO polymer with a relatively low molecular weight also increases. In contrast, for obtaining HFPO polymer with a weight average molecular weight 1,500-3,000, reaction temperature is preferred to be maintained within 10-20° C. When the reaction temperature during the step (b) is lower than 10° C., HFPO polymer may grow more than desired. When the temperature is higher than 20 ° C., the dissociation of fluoride anions may increase, thus in turn increasing HFPO polymer with a relatively low molecular weight.

The HFPO is preferred to be introduced at an average rate of 1.5-2.5 g/min, more preferably at a rate of 1.8-2.2 g/min. If the rate is higher than the upper limit, the anionic reaction may proceed insufficiently. Meanwhile, if the introduction is slower than the lower limit, the production time may increase. After HFPO is introduced at the aforementioned average rate for 8-10 hours, either continuously or discontinuously, thus allowing anionic polymerization to proceed, the reaction is allowed to stand sufficiently for the termination of reaction.

After the termination of reaction, fluorinated metal is removed through filtration, and HFP oligomer, HFPO with a relatively low molecular weight and solvent (tetraethyleneglycoldimethylether) are moved in a distillation tower equipped with a reboiler (2 L), a pack column (Φ50-×1200 L), a reflux condenser and a vacuum line, thus affording HFPO polymer.

Thus obtained HFPO polymer has a weight average molecular weight of 1,500-4,000 more preferably 2,000-4,000 within the temperature of −10 to 20° C.

EXAMPLES

The present invention will be described based on the following Examples. However, the present invention is not limited by the same.

Example 1

Tetraethylene glycol dimethylether (a polar solvent, 10 g) and dried cesium fluoride (an anionic initiator, 5 g) were introduced into a reactor equipped with a temperature controller, a stirrer and a pressure gauge under nitrogen atmosphere. The reactor was maintained at 30° C. using circulatory cooler, and HFP 200g was introduced for the anionic reaction, thus affording HFP oligomer. Thus prepared HFP oligomer was ascertained to contain 35 wt % of hexafluoro dimer and 65 wt % of hexafluoro trimer as analysed by using a GPC (gel permeation chromatography, Younglin Instruments) equipped with a Jordi DVB column and a refractive index detector (step 1, the FIGURE).

After the reaction of preparing HFP oligomer was completed, the temperature in a reactor was maintained at 40° C. Then, a total of 1,000 g of HFP was introduced for 9 hours at a rate of 1.85 g/min, and anionic polymerization was conducted (step 2). After the reaction was completed, the reactor was allowed to stand for 30 minutes, a small amount of product mixture was separated through a valve on a lower part of the reactor.

The product mixture was analysed using the aforementioned GPC without additional filtration, thus ascertaining that the weight average molecular weight is 1,700.

Examples 2-8 and Comparative Examples 1-7

HFPO polymer was prepared as described in Example 1 except that reaction conditions and compositions were adjusted as shown in Table 1.

TABLE 1

| | Category (unit g) | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Step (a) | Reaction Temp. | 30° C. | 30° C. | 30° C. | 30° C. | 30° C. | 30° C. | 30° C. | 35° C. |
| | anionic initiator | 5 g | 5 g | 5 g | 5 g | 5 g | 5 g | 5 g | 5 g |
| | polar solvent | 10 g | 10 g | 10 g | 10 g | 5 g | 15 g | 20 g | 10 g |
| | HFP | 200 g | 200 g | 200 g | 200 g | 200 g | 200 g | 200 g | 200 g |
| | Weight ratio of hexafluoro dimer and trimer contained in HFPO oligomer Step (b) | 35:65 | 35:65 | 35:65 | 35:65 | 25:75 | 27:32 | 20:80 | 30:70 |
| Step (b) | Reaction Temp. | 20° C. | 10° C. | 0° C. | −10° C. | 20° C. | 0° C. | 20° C. | 20° C. |
| | Total amount of HPFO | 1000 g | 1000 g | 1000 g | 1000 g | 1000 g | 1000 g | 1000 g | 1000 g |
| | Introduction rate of HPFO | 1.85 g/min | 1.85 g/min | 1.85 g/min | 1.85 g/min | 1.85 g/min | 1.85 g/min | 1.85 g/min | 1.85 g/min |
| Weight average molecular weight of prepared HFPO polymer | | 1,700 | 2,100 | 3,600 | 3,150 | 1,600 | 2,900 | 1,550 | 1,900 |
| Yield (%) | | 95 | 96 | 96 | 94 | 93 | 91 | 92 | 93 |

TABLE 2

| | Category (unit g) | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Step (a) | Reaction Temp. | 15° C. | 45° C. | 30° C. | 30° C. | 30° C. | 30° C. | 30° C. |
| | anionic initiator | 5 g | 5 g | 5 g | 5 g | 5 g | 5 g | 5 g |
| | polar solvent | 10 g | 10 g | 30 g | 10 g | 2 g | 10 g | 10 g |
| | HFP | 200 g | 200 g | 200 g | 200 g | 200 g | 200 g | 200 g |
| | Weight ratio of hexafluoro dimer and trimer contained in HFPO oligomer Step (b) | 29:71 | 18:82 | 15:85 | 35:65 | 18:845 | 35:85 | 35:85 |
| Step (b) | Reaction Temp. | 35° C. | 30° C. | 0° C. | 0° C. | 0° C. | 40° C. | 30° C. |
| | Total amount of HPFO | 1000 g | 1000 g | 1000 g | 1000 g | 1000 g | 1000 g | 1000 g |
| | Introduction rate of HPFO | 1.85 g/min | 1.85 g/min | 1.85 g/min | 2.80 g/min | 1.85 g/min | 1.85 g/min | 1.85 g/min |
| Weight average molecular weight of prepared HFPO polymer | | 1,350 | 600 | 1,100 | 1,300 | 700 | 600 | 1,000 |
| Yield (%) | | 82 | 85 | 83 | 75 | 80 | 77 | 79 |

It was confirmed that a process of preparing HFPO polymer disclosed in the present invention enables HFPO polymer with a weight average molecular weight of 1,500-4,000 in a relatively high yield. HFPO polymer composition of the present invention and its preparation process are applicable to a variety of areas such as a vacuum pump, an automobile, a memory hard disk, a diluent for the use in aerospace engineering, grease, a release agent, liquid with a relatively low refractive index and oils.

What is claimed is:

1. A process of preparing hexafluoropropylene oxide polymer, the process comprising:
   (a) preparing hexafluoropropylene dimer and hexafluoropropylene trimer by introducing hexafluoropropylene to a mixture of an anionic initiator and a polar solvent at 20-40° C. and under nitrogen altiosphere, wherein the hexafluoropropylene dimer and hexafluoropropylene trimer are present in a weight ratio of 20-40:80-60 based on the total weight of the hexafluoropropylene dimer and hexafluoropropylene trimer; and
   (b) preparing hexafluoropropylene oxide polymer of Formula 1 by introducing hexafluoropropylene oxide at an average rate of 1.5-2.5 g/min at −10 to 20° C. to a reactor after the step (a) is conducted, wherein the amount of hexafluoropropylene oxide is 300-700 weight parts relative to 100 weight parts of the hexafluoropropylene dimer and hexafluoropropylene trimer:

$$CF_3CF_2CF_2O(CF(CF_3)CF_2O)_nCF(CF_3)COF$$ wherein n is an integer of 8-25. [Formula 1]

2. The process of preparing hexafluoropropylene oxide polymer of claim 1, wherein the hexafluoropropylene dimer is at least one selected from the group consisting of 1,1,1,2,3,4,5,5,5-nonafluoro-4-(trifluoromethyl)pent-2-ene and 1,1,1,3,4,4,5,5,5-nonafluoro-2-(trifluoromethyl)pent-2-ene, and the hexafluoropropylene trimer is 1,1,1,3,4,5,5,5-octafluoro-2,4-bis(trifluoromethyl)pent-2-ene.

3. The process of preparing hexafluoropropylene oxide polymer of claim 1, wherein a weight average molecular weight (Mw) of the hexafluotopropylene oxide polymer as measured at −10 to 20° C. is 1,500-4,000.

4. The process of preparing hexafluoropropylene oxide polymer of claim 2, wherein a weight average molecular weight (Mw) of the hexafluoropropylene oxide polymer as measured at −10 to 20° C. is 1,500-4,000.

* * * * *